US012657773B2

(12) United States Patent
Dehlin et al.

(10) Patent No.: US 12,657,773 B2
(45) Date of Patent: Jun. 16, 2026

(54) METHODS, COMPUTER PROGRAM PRODUCTS AND SYSTEMS FOR 3D RECONSTRUCTION

(71) Applicant: VANTOR SWEDEN AB, Linköping (SE)

(72) Inventors: Jonas Dehlin, Linköping (SE); Sanna Ringqvist, Linköping (SE); Folke Isaksson, Linköping (SE); Johan Borg, Linköping (SE); Tim Yngesjö, Linköping (SE); Thomas Beckman, Linköping (SE); Erica Strand, Linköping (SE); Carl Sundelius, Linköping (SE); Jesper Otterholm, Linköping (SE); Andreas Norrstig, Linköping (SE)

(73) Assignee: VANTOR SWEDEN AB, Linköping (SE)

( * ) Notice: Subject to any disclaimer, the term of this patent is extended or adjusted under 35 U.S.C. 154(b) by 60 days.

(21) Appl. No.: 18/650,327

(22) Filed: Apr. 30, 2024

(65) Prior Publication Data

US 2025/0336094 A1    Oct. 30, 2025

(51) Int. Cl.
G06T 7/80        (2017.01)
G06T 5/50        (2006.01)
(Continued)

(52) U.S. Cl.
CPC .................. G06T 7/85 (2017.01); G06T 5/50 (2013.01); G06T 5/70 (2024.01); G06T 5/73 (2024.01);
(Continued)

(58) Field of Classification Search
None
See application file for complete search history.

(56) References Cited

U.S. PATENT DOCUMENTS

| | | | |
|---|---|---|---|
| 2004/0075566 A1* | 4/2004 | Stepanik | ............ G01N 33/0075 340/870.3 |
| 2017/0200309 A1 | 7/2017 | Qian et al. | |
| 2022/0122318 A1 | 4/2022 | Querbes et al. | |
| 2022/0215620 A1* | 7/2022 | Lieb | ......................... G06T 7/35 |

FOREIGN PATENT DOCUMENTS

KR        20220017697        2/2022

OTHER PUBLICATIONS

Elhashash Mostafa et al: "Cross-view SLAM solver: Global pose estimation of monocular ground-level video frames for 3D reconstruction using a reference 3D model from satellite images", ISPRS Journal of Photogrammetry and Remote Sensing, Amsterdam [U.A.] : Elsevier, Amsterdam, NL, vol. 188, Apr. 8, 2022 (Apr. 8, 2022), pp. 62-74, XP087058908.

(Continued)

*Primary Examiner* — Xiaolan Xu
(74) *Attorney, Agent, or Firm* — Harness, Dickey & Pierce, P.L.C.

(57)        ABSTRACT

The present disclosure relates to a method (100) for 3D reconstruction. The method comprises obtaining (S100) a set of images, each image overlapping a region of interest, performing (S400) image registration for the set of images, wherein performing the image registration comprises correlating (S410) each image with a reference 3D data set, the correlating (S410) of each image with the reference 3D data set being arranged to determine the positional accuracy of each image to the same positional accuracy of the reference 3D data set, and generating (S600) a 3D data set relating to the region of interest using (S610) 3D reconstruction based on the registered images. The present disclosure also relates to corresponding computer program products and systems.

12 Claims, 2 Drawing Sheets

---

S500
generating a water mask based on the set of images

S510
generating a 3D model based on the registered set of images

S520
generating a set of synthetic images based on the generated 3D model

S530
classifying each pixel of the synthetic images as either water or non-water

S540
refining the contour of the water mask based on a comparison between the classified synthetic images and the reference 3D data set

(51) Int. Cl.

| | |
|---|---|
| G06T 5/70 | (2024.01) |
| G06T 5/73 | (2024.01) |
| G06T 7/11 | (2017.01) |
| G06T 7/32 | (2017.01) |
| G06T 7/593 | (2017.01) |
| G06T 17/05 | (2011.01) |
| H04N 13/111 | (2018.01) |

(52) U.S. Cl.
CPC .................. *G06T 7/11* (2017.01); *G06T 7/32* (2017.01); *G06T 7/593* (2017.01); *G06T 17/05* (2013.01); *H04N 13/111* (2018.05); *G06T 2207/10012* (2013.01); *G06T 2207/20192* (2013.01); *G06T 2210/32* (2013.01)

(56) References Cited

OTHER PUBLICATIONS

Blaha Maros et al: "Semantically Informed Multiview Surface Refinement", 2017 IEEE International Conference on Computer Vision (ICCV), IEEE, Oct. 22, 2017 (Oct. 22, 2017), pp. 3839-3847, XP033283255.

Lee Ik Hyun et al: "Robust Registration of Cloudy Satellite Images Using Two-Step Segmentation", IEEE Geoscience and Remote Sensing Letters, IEEE, USA, vol. 12, No. 5, May 1, 2015 (May 1, 2015), pp. 1121-1125, XP011573121.

* cited by examiner

100

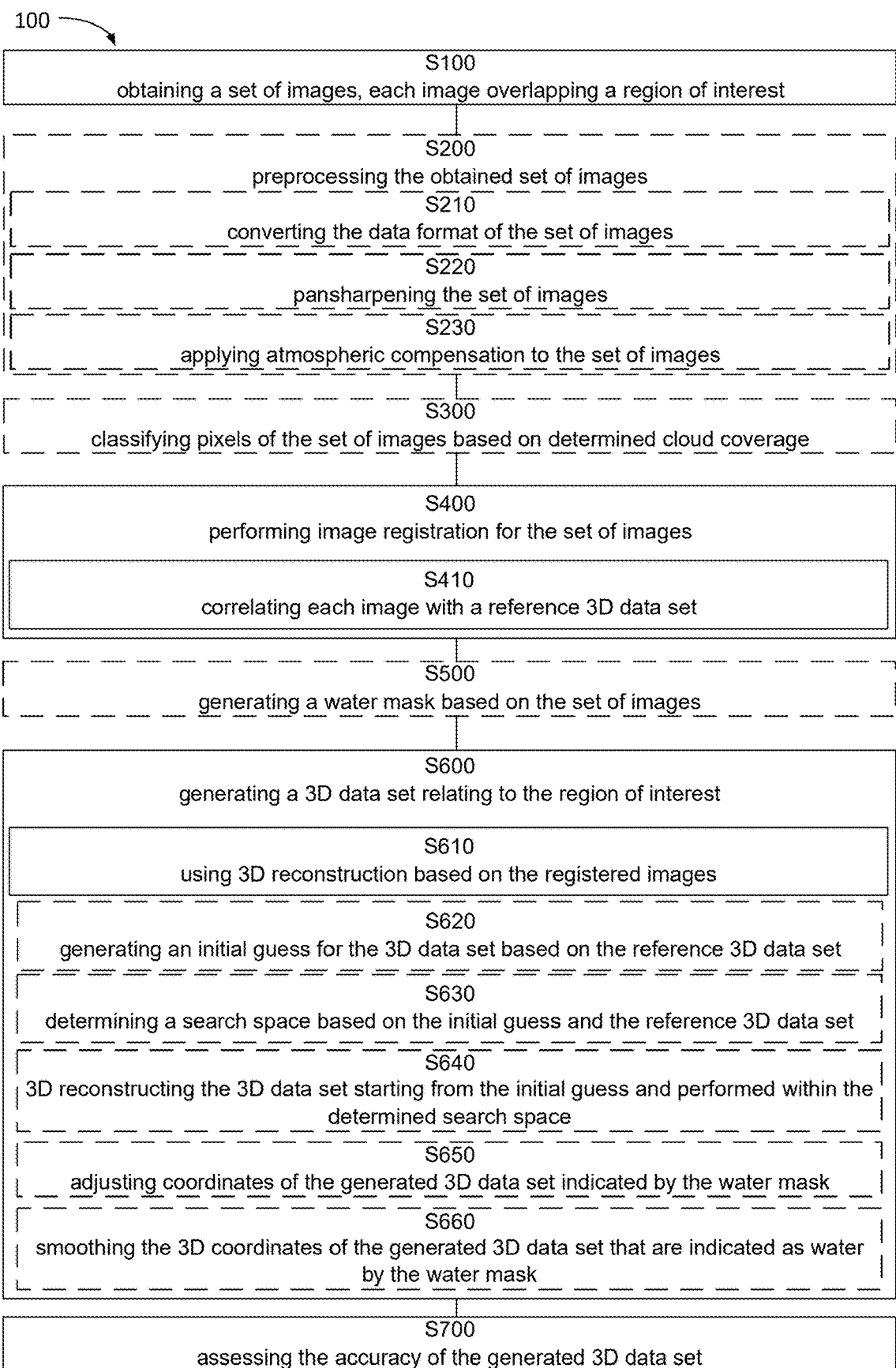

S100
obtaining a set of images, each image overlapping a region of interest

S200
preprocessing the obtained set of images

S210
converting the data format of the set of images

S220
pansharpening the set of images

S230
applying atmospheric compensation to the set of images

S300
classifying pixels of the set of images based on determined cloud coverage

S400
performing image registration for the set of images

S410
correlating each image with a reference 3D data set

S500
generating a water mask based on the set of images

S600
generating a 3D data set relating to the region of interest

S610
using 3D reconstruction based on the registered images

S620
generating an initial guess for the 3D data set based on the reference 3D data set

S630
determining a search space based on the initial guess and the reference 3D data set

S640
3D reconstructing the 3D data set starting from the initial guess and performed within the determined search space

S650
adjusting coordinates of the generated 3D data set indicated by the water mask

S660
smoothing the 3D coordinates of the generated 3D data set that are indicated as water by the water mask

S700
assessing the accuracy of the generated 3D data set

Fig. 1a

METHODS, COMPUTER PROGRAM PRODUCTS AND SYSTEMS FOR 3D RECONSTRUCTION

TECHNICAL FIELD

The present disclosure relates to the field of 3D reconstruction.

BACKGROUND ART 3D reconstruction is a process where the 3D shape, and possibly texture, is derived from a range of possible sources. Common 3D reconstruction processes are based on image processing, such as observing an object from different perspectives and/or under different conditions and generate a 3D-representation of the object. A significant challenge in such 3D reconstruction processes is accuracy of the generated 3D-representation; errors associated with correlating images captured at different perspectives or under different conditions, e.g. different types of cameras, can propagate through the 3D reconstruction process and result in an unsatisfactory 3D model. There is thus a need in the art for improved 3D reconstruction.

SUMMARY OF THE INVENTION

The present disclosure relates to a method for 3D reconstruction. The method comprises obtaining a set of images, each image overlapping a region of interest. The method further comprises performing image registration for the set of images. The image registration comprises determining a set of intrinsic and/or extrinsic camera parameters for each image. Performing the image registration comprises correlating each image with a reference 3D data set. The correlating of each image with the reference 3D data set is arranged to update the intrinsic and/or extrinsic camera parameters for each image. The method also comprises generating a 3D data set relating to the region of interest using 3D reconstruction based on the registered images.

By correlating each image with the reference 3D data set, reference data having a high precision of e.g. positional accuracy can be used to improve the registration accuracy, thereby improving the positional accuracy to the set of images. The improved accuracy will carry over to the 3D reconstruction when generating the 3D data set. Stated differently, correlating each image with the reference 3D data set is arranged to improve the positional accuracy of each image based on the positional accuracy of the reference 3D data set. In other words, the disclosed method enables the generation of a high precision 3D data set from lower precision data.

According to some aspects, the set of images comprises a set of stereo image pairs.

Stereo image pairs facilitate registration between the images as relative camera positions are typically known in advance, as well as the images overlapping the same region and thereby having many of the same terrain features in common, albeit from different angles.

According to some aspects, using 3D reconstruction comprises generating an initial guess for the 3D data set based on the reference 3D data set. Using 3D reconstruction further comprises determining a search space based on the initial guess and the reference 3D data set, the search space being arranged to limit the potential parameters of the 3D data set during subsequent 3D reconstruction. Using 3D reconstruction also comprises 3D reconstructing the 3D data set, the 3D reconstruction starting from the generated initial guess and performed within the determined search space.

Being able to generate a good initial guess and limit the subsequent search for optimal 3D reconstruction significantly speeds up the 3D reconstruction and eliminates many potential erroneous 3D reconstruction candidates for being considered. In other words, the technical effect is a more accurate 3D reconstruction obtained in less time compared to an arbitrary initial state and an unconstrained 3D reconstruction space.

According to some aspects, the method further comprises assessing the accuracy of the generated 3D data set based on a comparison between 2D and/or 3D coordinates of the generated 3D data set and 2D and/or coordinates of the reference 3D data set.

Assessing the accuracy ensures that the image registration has been successful, including the correlation the reference 3D data set and the associated transfer of accuracy.

According to some aspects, performing image registration comprises iterative refinement of a set of camera parameters for a camera model describing how the registered images were captured.

According to some aspects, performing image registration comprises registering a first image to the reference 3D data set using a first subset of the intrinsic and/or extrinsic camera parameters of the camera model used for the registration of the first image. Performing image registration further comprises generating an updated reference 3D data set by adding texture from the registered first image to the reference 3D data set. Performing image registration also comprises registering a second image overlapping the region covered by the first image to the updated reference 3D data set using a second subset of intrinsic and/or extrinsic camera parameters of said camera model.

This enables a robust image registration process while obtaining desired accuracy.

According to some aspects, the method further comprises generating a water mask based on the set of images and adjusting coordinates of the generated 3D data set indicated by the water mask, the adjusting being arranged to reduce a height variance about a predicted water level.

By reducing height variance, a more accurate water surface is obtained, and by extension a more accurate generated 3D data set. The height variance of the water surface can also be used to access the accuracy of the 3D reconstruction in downstream accuracy assessment.

According to some aspects, generating the water mask further comprises generating a 3D model based on the registered set of images. Generating the water mask also comprises generating a set of synthetic images based on the generated 3D model, the set of synthetic images comprising height information and/or correlation information relating to estimated 2D and/or 3D coordinates associated with the pixels of the registered images. Generating the water mask additionally comprises classifying each pixel of the synthetic images as either water or non-water. Generating the water mask further comprises refining the contour of the water mask based on a comparison between the classified synthetic images and the reference 3D data set.

According to some aspects, the 3D reconstruction further comprises smoothing the 3D coordinates of the generated 3D data set that are indicated as water by the water mask, the smoothing being arranged to reduce coordinate errors caused by correlation errors of the 3D reconstruction.

According to some aspects, the method further comprises preprocessing the obtained set of images. The preprocessing comprises at least one of converting the data format of the set of images, pansharpening the set of images, and applying atmospheric compensation to the set of images.

Preprocessing the images act synergistically with downstream steps. For instance, pansharpening the images and/or applying atmospheric compensation improves registration accuracy and consequently the accuracy of the generated 3D data set. Converting the data format can improve resource usage, e.g. by reducing the memory footprint, which in turn enables fast hardware such as graphical processing units, GPUs, to be used for some tasks that would otherwise need to be handled by a central processing unit, CPU, in communication with random access memory, RAM.

According to some aspects, the method further comprises classifying pixels of the set of images based on determined cloud coverage.

By taking cloud coverage into consideration, cloud covered pixels can be excluded from influencing the registration process and/or the comparison with the reference 3D data set, thereby resulting in more accurate image registration and better correlation with the reference 3D data set. Cloud coverage can also be used directly in the 3D reconstruction to improve the 3D reconstruction accuracy when generating the 3D data set.

The present disclosure further relates to a computer program product comprising a non-transitory computer-readable storage medium having thereon a computer program comprising program instructions, the computer program being loadable into a processor and configured to cause the processor to perform the method for 3D reconstruction as described above and below.

The present disclosure also relates to a system for 3D reconstruction. The system comprises a processor and a memory, the memory having stored thereon a computer program comprising program instructions, the computer program being loadable into the processor and configured to cause the processor to perform the method for 3D reconstruction as described above and below.

BRIEF DESCRIPTION OF THE DRAWINGS

FIGS. 1a-1c illustrate the disclosed method for 3D reconstruction; and

DETAILED DESCRIPTION

Figure 1B:
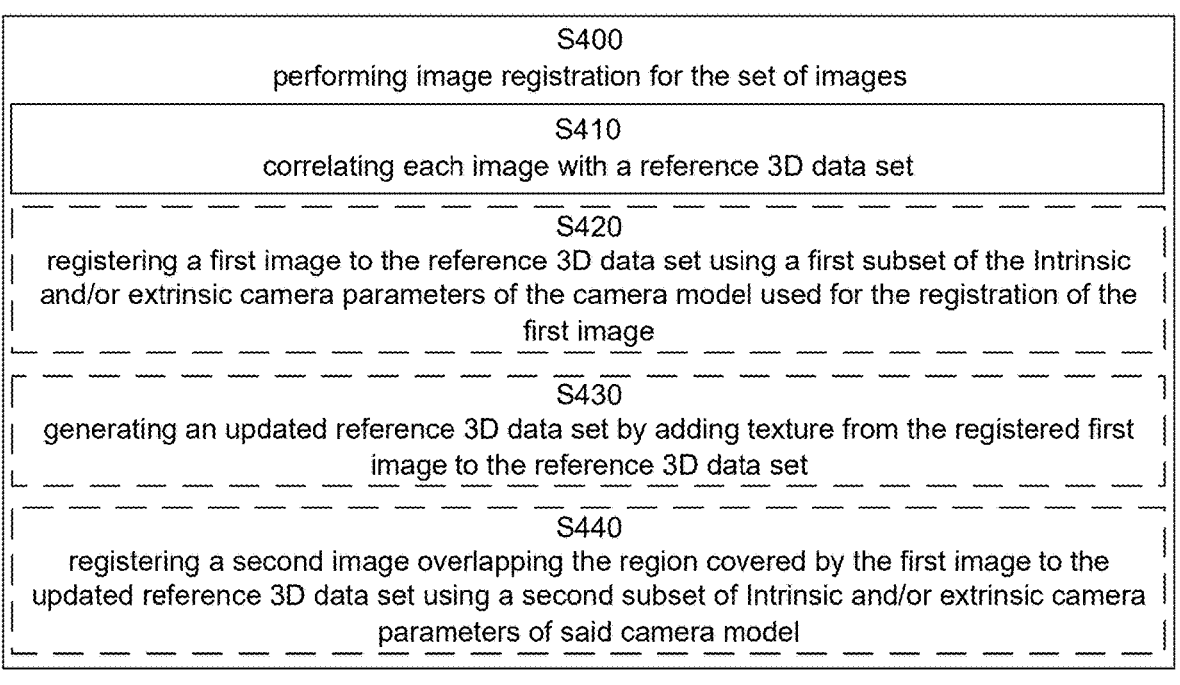
Figure 1C:
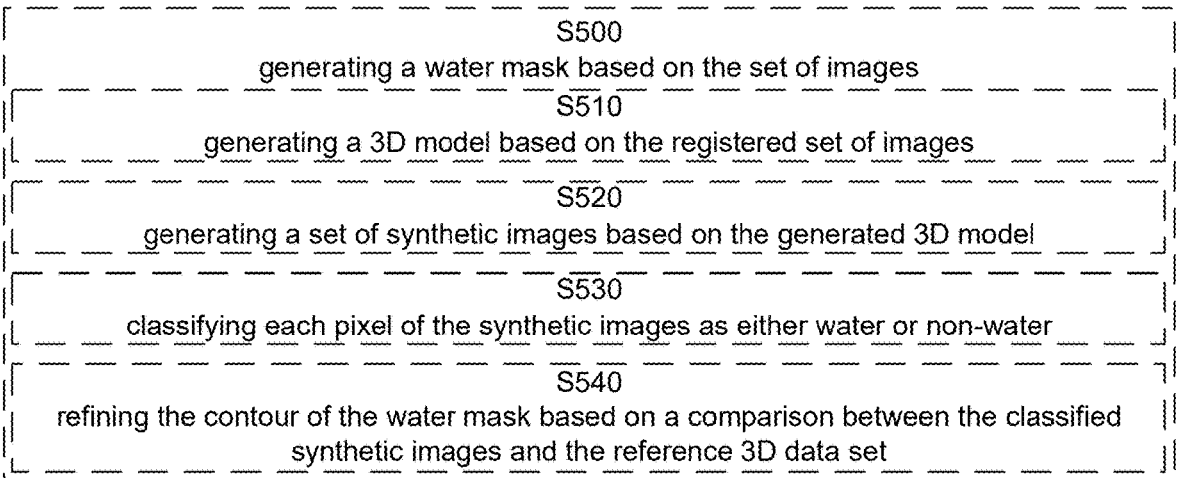

FIGS. 1a-1c illustrate the method 100 for 3D reconstruction. A primary objective of the present disclosure is to provide a method that can be fully automated and that generates a 3D data set by 3D reconstruction, wherein the 3D data set is ensured to have meet predetermined accuracy criteria.

The method comprises obtaining S100 a set of images. Each image overlaps a region of interest.

According to some aspects, the set of images comprises one or more of an aerial photography, a drone-photo 2D or stereo, satellite imagery, synthetic-aperture radar, SAR, imagery, panchromatic imagery. According to some aspects, the set of images comprises a set of stereo image pairs.

Before performing image registration, it is often desirable to preprocess the obtained images to improve the registration process and enable more efficient processing of the images. Thus, according to some aspects, the method further comprises preprocessing S200 the obtained set of images. The preprocessing S200 comprises at least one of: converting S210 the data format of the set of images, pansharpening S220 the set of images, and applying S230 atmospheric compensation to the set of images.

According to some aspects, the method 100 further comprises classifying S300 pixels of the set of images based on determined cloud coverage. According to some further aspects, the classifying S300 of pixels is performed using a neural network. According to some further aspects, the classified pixels are used to define a shape, such as a polygon, representing the cloud coverage.

The method further comprises performing S400 image registration for the set of images. The image registration comprises determining a set of intrinsic and/or extrinsic camera parameters for each image. Performing the image registration comprises correlating S410 each image with a reference 3D data set. The correlating S410 of each image with the reference 3D data set is arranged to update the intrinsic and/or extrinsic camera parameters for each image.

The reference 3D data set overlaps with the region of interest. According to some aspects, the reference 3D data set comprises a textured 3D model and/or a point cloud with or without RGB colors and/or a data set formed by LIDAR+ photogrammetry reconstruction. According to some aspects, the reference 3D data set comprises data classified to belong to a predetermined category, such as water, land, road, bridge, building, vegetation. The reference 3D data set comprising data classified into categories can be used to improve the 3D reconstruction and/or be used as part of accuracy assessment, as will be described further below.

As described above, the reference 3D data set preferably has a high accuracy that can be leveraged by the correlation S410 of images to improve the quality of the performed S400 image registration. Thus, according to some aspects, the correlating S410 of each image with the reference 3D data set is arranged to improve the positional accuracy of each image based on the positional accuracy of the reference 3D data set. The correlating S410 of the images with the reference 3D data set is one of the main ways the disclosed method 100 ensures that the 3D data set generated by the method have a desired accuracy that may not be obtained from only registering the images to each other. According to some aspects, the correlating S410 of each image with the reference 3D data set comprises registering one or more images with the reference 3D data set. In one example, the registration of the one or more images with the reference 3D data set is performed by projecting the one or more images onto the reference 3D data set, or vice versa, and aligning the projection with the target onto which the projection was made. In another example, synthetic images are generated based on the reference 3D data set and the one or more images registered with the reference 3D data set are registered with the synthetic images. According to some aspects, the correlating S410 of each image is performed before the images are registered S400 to each other. According to some aspects, the correlating S410 of each image is performed simultaneously as the images are registered S400 to each other.

According to some aspects, performing S400 image registration comprises registering S420 a first image to the reference 3D data set using a first subset of the intrinsic and/or extrinsic camera parameters of the camera model used for the registration S420 of the first image. According to some aspects, the first subset of intrinsic and/or extrinsic camera parameters is less than all intrinsic and/or extrinsic camera parameters of the camera model. In other words, the first image is registered S420 to the reference 3D data set not using all intrinsic and/or extrinsic parameters of the camera model. Performing S400 image registration further comprises generating S430 an updated reference 3D data set by adding texture from the registered S420 first image to the reference 3D data set. Performing S400 image registration also comprises registering S440 a second image overlapping the region covered by the first image to the updated reference 3D data set using a second subset of intrinsic and/or extrinsic camera parameters of said camera model. According to some aspects, the second subset comprises more intrinsic and/or extrinsic camera parameters than the first subset of camera parameters. According to some aspects, the second subset of intrinsic and/or extrinsic camera parameters comprises different camera parameters than those of the first subset of intrinsic and/or extrinsic camera parameters. According to some aspects, the second subset of intrinsic and/or extrinsic camera parameters is less than all intrinsic and/or extrinsic camera parameters of the camera model. Thus, according to some aspects, the first subset of intrinsic and/or extrinsic camera parameters is less than all intrinsic and/or extrinsic camera parameters of the camera model and the second subset comprises more and/or different intrinsic and/or extrinsic camera parameters than the first subset of intrinsic and/or extrinsic camera parameters, optionally with the second subset of intrinsic and/or extrinsic camera parameters being less than all intrinsic and/or extrinsic camera parameters of the camera model.

Image registration as described above and below does not need to happen in a single step, but is often performed as gradual parameter fitting an iterative manner. Thus, according to some aspects, performing S400 image registration comprises iterative refinement of a set of camera parameters for a camera model describing how the registered images were captured.

The method further comprises generating S600 a 3D data set relating to the region of interest using S610 3D reconstruction based on the registered images.

According to some aspects, the generation of the 3D data set is refined based on terrain type. Image features can be classified, e.g. as forests, which can be combined with knowledge of properties of the class. For instance, forests grow, and knowledge of forest age can be used to adjust the height of the generated 3D model. Water surfaces will be determined by the shape of the solid container of the landscape in which the water sits or flows, and will preferably be described by a smooth surface. However, reconstructed water surfaces in 3D models sometimes feature irregular surfaces due to small reconstruction errors.

Thus, according to some aspects, the method 100 further comprises generating S500 a water mask based on the set of images, and adjusting S650 coordinates of the generated S600 3D data set indicated by the water mask. The adjusting S650 is arranged to reduce a height variance about a predicted water level. The predicted water level does not have to be known before height variance can be reduced. The water level can emerge as part of a smoothing process, such as Laplacian smoothing of a water-masked portion of the generated 3D data set, with the smoothed water surface corresponding to the predicted water level. Thus, according to some aspects, the 3D reconstruction further comprises smoothing S660 the 3D coordinates of the generated S600 3D data set that are indicated as water by the water mask, the smoothing S660 being arranged to reduce coordinate errors caused by correlation errors of the 3D reconstruction.

According to some aspects, generating S500 the water mask further comprises generating S510 a 3D model based on the registered set of images. The generated S510 3D model will often not be the same as the final 3D data set generated S600 by the method 100. Generating S500 the water mask also comprises generating S520 a set of synthetic images based on the generated 3D model. According to some further aspects, the set of synthetic images comprises height information and/or correlation information relating to estimated 2D and/or 3D coordinates associated with the pixels of the registered images. According to some aspects, the set of synthetic images are generated to represent an aerial photography, a drone-photo 2D or stereo, satellite imagery, synthetic-aperture radar, SAR, imagery, panchromatic imagery. Generating S500 the water mask additionally comprises classifying S530 each pixel of the synthetic images as either water or non-water. Generating S500 the water mask further comprises refining S540 the contour of the water mask based on a comparison between the classified synthetic images and the reference 3D data set. According to some aspects, the reference 3D data set comprises classification data. According to some further aspects, refining S540 the contour of the water mask is based on a comparison between the classification of the synthetic images and the classification data of the reference 3D data set.

The generation S600 of the 3D data set can be made more robust and efficient by using the reference 3D data set. According to some aspects, using S610 3D reconstruction comprises generating S620 an initial guess for the 3D data set based on the reference 3D data set. For instance, the height field and/or the 3D coordinates of the reference 3D data set can be taken as the initial guess. According to some aspects, the set of registered images are compared to the reference 3D data set to determine regions within the region of interest where using the reference 3D data is a good approximation to an initial guess. In addition to generate a probable starting point, knowledge of the terrain and how a landscape typically changes can be used to estimate how much the region of interest can deviate from the initial guess. Thus, according to some aspects, using S610 3D reconstruction also comprises determining S630 a search space based on the initial guess and the reference 3D data set, the search space being arranged to limit the potential parameters of the 3D data set during subsequent 3D reconstruction. Using S610 3D reconstruction comprises 3D reconstructing S640 the 3D data set, the 3D reconstruction S630 starting from the generated initial guess and performed within the determined search space.

With the 3D data set generated S600, the registration S400 and 3D reconstruction S610 can be evaluated by comparing the generated S600 3D data set with the reference 3D data set. Thus, according to some aspects, the method further comprises assessing S700 the accuracy of the generated 3D data set based on a comparison between 2D and/or 3D coordinates of the generated 3D data set and 2D and/or 3D coordinates of the reference 3D data set.

An important technical effect and advantage is that the disclosed method can be fully automated.

Thus, the present disclosure further relates to a computer program product comprising a non-transitory computer-readable storage medium having thereon a computer program comprising program instructions, the computer program being loadable into a processor and configured to cause the processor to perform the method for 3D reconstruction as described above and below.

Figure 2:
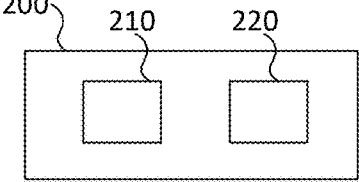
FIG. 2 illustrates a system for 3D reconstruction.

FIG. 2 illustrates a system 200 for 3D reconstruction. The system 200 comprises a processor 210 and a memory 220. The memory 200 has stored thereon a computer program comprising program instructions, the computer program being loadable into the processor 210 and configured to cause the processor 210 to perform the method 100 for 3D reconstruction as described above and below.

As used herein, a computer includes at least one processing unit or processor and a system memory. The computer typically includes at least some form of computer readable non-transitory media. As used herein, the terms "processor" and "computer" and related terms are not limited to just those integrated circuits referred to in the art as a computer, but broadly refers to a microcomputer, a programmable logic controller (PLC), an application specific integrated circuit, and other programmable circuits configured to carry out programmable instructions, and these terms are used interchangeably herein. In the embodiments described herein, memory may include, but is not limited to, a computer-readable medium or computer storage media, volatile and non-volatile media, removable and non-removable media implemented in any method or technology for storage of information such as computer readable instructions, data structures, program modules, or other data, Such memory includes random access memory (RAM), computer storage media, communication media, and a computer-readable non-volatile medium such as a flash memory. Alternatively, a floppy disc, a compact disc-read only memory (CD_ROM), a magneto optical disk (MOD), and/or a digital versatile disc (DVD) may also be used. Also, in the embodiments described herein, additional input channels may be, but are not limited to computer peripherals associated with an operator, such as a mouse, keyboard, scanner and the like. Furthermore, additional output channels such as a computer monitor or other display device, printer or communications device may be included.

The methods and processes described herein may be embodied in computer software. The computer software may be provided in a number of ways, for example, non-transitory computer-readable storage medium, such as any nonvolatile memory device. Further, different parts of the computer software can be executed by different devices, such as, for example, in a client-server setup.

While embodiments of the invention have been described herein with respect to the figures, it will be appreciated that many modifications and changes may be made by those skilled in the art without departing from the spirit of the invention. Any such variation or deviation from the above description and figures are included in the scope of the invention as set forth in the claims.

What is claimed is:

1. A method for 3D reconstruction, the method comprising obtaining a set of images, each image overlapping a region of interest, performing, by a processor, image registration for the set of images, the image registration comprising determining a set of intrinsic and/or extrinsic camera parameters for each image, wherein performing the image registration comprises:

correlating, by the processor, each image with a reference 3D data set, the correlating of each image with the reference 3D data set being arranged to update the intrinsic and/or extrinsic camera parameters for each image, and generating, by the processor, a 3D data set relating to the region of interest using 3D reconstruction based on the registered images, wherein generating the 3D data set relating to the region of interest comprises:

generating an initial guess for the 3D data set based on the reference 3D data set;

determining a search space based on the initial guess and the reference 3D data set, the search space being arranged to limit potential parameters of the 3D data set during subsequent 3D reconstruction; and 3D reconstructing the 3D data set, the 3D reconstruction starting from the generated initial guess and performed within the determined search space.

2. The method according to claim 1, wherein the set of images comprises a set of stereo image pairs.

3. The method according to claim 1, further comprising:

assessing, by the processor, accuracy of the generated 3D data set based on a comparison between 2D and/or 3D coordinates of the generated 3D data set and 2D and/or coordinates of the reference 3D data set.

4. The method according to claim 1, wherein performing image registration comprises iterative refinement of a set of the intrinsic and/or extrinsic camera parameters for a camera model describing how the registered images were captured.

5. The method according to claim 1, wherein performing image registration comprises:

registering, by the processor, a first image to the reference 3D data set using a first subset of the intrinsic and/or extrinsic camera parameters of a camera model used for the registration of the first image, generating, by the processor, an updated reference 3D data set by adding texture from the registered first image to the reference 3D data set, and registering, by the processor, a second image overlapping the region covered by the first image to the updated reference 3D data set using a second subset of intrinsic and/or extrinsic camera parameters of said camera model.

6. The method according to claim 1, further comprising:

generating, by the processor, a water mask based on the set of images, and adjusting, by the processor, coordinates of the generated 3D data set indicated by the water mask, the adjusting being arranged to reduce a height variance about a predicted water level.

7. The method according to claim 6, wherein generating the water mask further comprises:

generating, by the processor, a 3D model based on the registered set of images, generating, by the processor, a set of synthetic images based on the generated 3D model, the set of synthetic images comprising height information and/or correlation information relating to estimated 2D and/or 3D coordinates associated with pixels of the registered images, classifying, by the processor, each pixel of the synthetic images as either water or non-water, refining, by the processor, contour of the water mask based on a comparison between the classified synthetic images and the reference 3D data set.

8. The method according to claim 6, wherein the 3D reconstruction further comprises:

smoothing the 3D coordinates of the generated 3D data set that are indicated as water by the water mask, the smoothing (S660) being arranged to reduce coordinate errors caused by correlation errors of the 3D reconstruction.

9. The method according to claim 1, further comprising:

preprocessing the obtained set of images, the preprocessing comprising at least one of:

converting a data format of the set of images, pansharpening the set of images, and applying atmospheric compensation to the set of images.

10. The method according to claim 1, further comprising:

classifying pixels of the set of images based on determined cloud coverage.

11. A computer program product comprising a non-transitory computer-readable storage medium having thereon a computer program comprising program instructions, the computer program being loadable into a processor and configured to cause the processor to perform a method for 3D reconstruction by:

obtaining (S100) a set of images, each image overlapping a region of interest, performing (S400) image registration for the set of images, the image registration comprising determining a set of intrinsic and/or extrinsic camera parameters for each image, wherein performing the image registration comprises:

correlating (S410) each image with a reference 3D data set, the correlating (S410) of each image with the reference 3D data set being arranged to update the intrinsic and/or extrinsic camera parameters for each image, and generating (S600) a 3D data set relating to the region of interest using (S610) 3D reconstruction based on the registered images, wherein generating the 3D data set relating to the region of interest comprises:

generating an initial guess for the 3D data set based on the reference 3D data set;

determining a search space based on the initial guess and the reference 3D data set, the search space being arranged to limit potential parameters of the 3D data set during subsequent 3D reconstruction; and 3D reconstructing the 3D data set, the 3D reconstruction starting from the generated initial guess and performed within the determined search space.

12. A system for 3D reconstruction, the system comprises a processor, and a memory, the memory having stored thereon a computer program comprising program instructions, the computer program being loadable into the processor and configured to cause the processor to perform the method for 3D reconstruction by:

obtaining a set of images, each image overlapping a region of interest, performing image registration for the set of images, the image registration comprising determining a set of intrinsic and/or extrinsic camera parameters for each image, wherein performing the image registration comprises;

correlating each image with a reference 3D data set, the correlating of each image with the reference 3D data set being arranged to update the intrinsic and/or extrinsic camera parameters for each image, and generating a 3D data set relating to the region of interest using 3D reconstruction based on the registered images, wherein generating the 3D data set relating to the region of interest comprises:

generating an initial guess for the 3D data set based on the reference 3D data set;

determining a search space based on the initial guess and the reference 3D data set, the search space being arranged to limit potential parameters of the 3D data set during subsequent 3D reconstruction; and 3D reconstructing the 3D data set, the 3D reconstruction starting from the generated initial guess and performed within the determined search space.

* * * * *